(12) United States Patent
Heldmann et al.

(10) Patent No.: US 10,253,807 B2
(45) Date of Patent: Apr. 9, 2019

(54) MAINTENANCE-FREE BEARING WITH TOLERANCE COMPENSATION PROPERTIES AGAINST WEAR AND MISALIGNMENT

(71) Applicant: SAINT-GOBAIN PERFORMANCE PLASTICS PAMPUS GMBH, Willich (DE)

(72) Inventors: Joerg Heldmann, Aachen (DE); Hans-Juergen Jaeger, Huerth (DE); Alexander Oehrlein, Neuss (DE)

(73) Assignee: SAINT-GOBAIN PERFORMANCE PLASTICS PAMPUS GMBH, Willich (DE)

( * ) Notice: Subject to any disclaimer, the term of this patent is extended or adjusted under 35 U.S.C. 154(b) by 123 days.

(21) Appl. No.: 15/423,261

(22) Filed: Feb. 2, 2017

(65) Prior Publication Data

US 2017/0146058 A1 May 25, 2017

Related U.S. Application Data

(62) Division of application No. 13/009,035, filed on Jan. 19, 2011, now Pat. No. 9,599,158.

(Continued)

(51) Int. Cl.
*F16C 27/02* (2006.01)
*F16C 33/04* (2006.01)
*F16C 33/28* (2006.01)

(52) U.S. Cl.
CPC ............. *F16C 27/02* (2013.01); *F16C 33/28* (2013.01); *F16C 2226/40* (2013.01)

(58) Field of Classification Search
CPC ...... F16C 27/02; F16C 33/28; F16C 2208/20; F16C 2208/22; F16C 2208/32; F16C 2208/60; F16C 2208/80; F16C 2226/40
See application file for complete search history.

(56) References Cited

U.S. PATENT DOCUMENTS 629,395 A 7/1899 Sargent
2,159,327 A 5/1939 Hendrick
(Continued)

FOREIGN PATENT DOCUMENTS

BE 534482 1/1955
CN 1446294 A 10/2003
(Continued)

OTHER PUBLICATIONS

International Preliminary Report on Patentability for PCT/EP2010/070124, dated Jun. 28, 2012, 8 pages.
(Continued)

*Primary Examiner* — Adam D Rogers
(74) *Attorney, Agent, or Firm* — Abel Law Group, LLP; Chi Suk Kim

(57) ABSTRACT

A system for elastically compensating for wear, thermal expansion and misalignment comprises a ring located between a housing and a pin in the bore of the housing. The ring has a backing layer, an expanded grid structure having a plurality of openings, a low friction layer penetrated into the openings of the expanded grid structure, and adhesive for bonding the backing layer, expanded grid structure and low friction layer together to provide elastic deformation of the ring between the housing and pin.

19 Claims, 14 Drawing Sheets

Related U.S. Application Data

(60) Provisional application No. 61/296,065, filed on Jan. 19, 2010.

(56) References Cited

U.S. PATENT DOCUMENTS

| | | | |
|---|---|---|---|
| 2,357,106 A | | 8/1944 | Grenot |
| 2,733,108 A | | 1/1956 | Cowles |
| 3,033,623 A | | 5/1962 | Thomson |
| 3,206,264 A | | 9/1965 | Dalzell et al. |
| 3,348,887 A | | 10/1967 | Sheps |
| 3,447,846 A | | 6/1969 | Marsh |
| 3,501,360 A | | 3/1970 | Mancel |
| 3,899,227 A | | 8/1975 | Harig |
| 3,950,047 A | * | 4/1976 | Capelli ............... F16C 33/102 384/298 |
| 3,950,599 A | * | 4/1976 | Board, Jr. ........... F16C 33/201 442/40 |
| 3,969,232 A | * | 7/1976 | Turner ................ F16C 11/0614 508/106 |
| 4,006,051 A | * | 2/1977 | Board, Jr. ........... F16C 33/201 156/247 |
| 4,084,863 A | | 4/1978 | Capelli |
| 4,111,499 A | | 9/1978 | McCloskey |
| 4,238,137 A | | 12/1980 | Furchak et al. |
| 4,263,361 A | * | 4/1981 | Hodes .................. B32B 15/14 442/229 |
| 4,358,167 A | | 11/1982 | Magazian et al. |
| 4,415,411 A | * | 11/1983 | Kanai .................. C25B 11/02 204/290.08 |
| 4,709,930 A | | 12/1987 | Forch |
| 4,743,033 A | | 5/1988 | Guess |
| 4,846,590 A | | 7/1989 | Teramachi |
| 4,923,550 A | | 5/1990 | Kramer |
| 5,062,721 A | | 11/1991 | Chiba |
| 5,125,755 A | | 6/1992 | Adler et al. |
| 5,127,218 A | | 7/1992 | Schiesser et al. |
| 5,163,692 A | | 11/1992 | Schofield et al. |
| 5,229,198 A | | 7/1993 | Schroeder |
| 5,364,682 A | * | 11/1994 | Tanaka ................. F16C 33/201 384/908 |
| 5,616,406 A | | 4/1997 | Nakamaru et al. |
| 5,732,322 A | * | 3/1998 | Nakamaru ........... F16C 33/201 428/550 |
| 6,106,936 A | | 8/2000 | Adam |
| 6,148,491 A | | 11/2000 | Bartocci |
| 6,390,682 B1 | | 5/2002 | McMeekin et al. |
| 6,416,226 B1 | | 7/2002 | Provence et al. |
| 6,425,977 B2 | | 7/2002 | McDonald et al. |
| 6,478,468 B2 | | 11/2002 | McMeekin et al. |
| 6,480,363 B1 | | 11/2002 | Prater |
| 6,485,608 B1 | | 11/2002 | McDonald et al. |
| 6,548,188 B1 | * | 4/2003 | Yanase ................. F16C 33/201 384/300 |
| 7,118,808 B2 | * | 10/2006 | Wolki .................. F16C 33/28 428/626 |
| 7,658,677 B2 | | 2/2010 | Needes et al. |
| 7,717,407 B2 | | 5/2010 | Welsch |
| 7,820,298 B2 | | 10/2010 | Welsch |
| 7,832,933 B2 | | 11/2010 | Adams et al. |
| 7,942,581 B2 | | 5/2011 | Leonardelli |
| 8,021,072 B2 | | 9/2011 | Court et al. |
| 8,118,492 B2 | | 2/2012 | Weiden et al. |
| 8,127,639 B2 | | 3/2012 | Manwaring et al. |
| 8,231,276 B2 | * | 7/2012 | Than Trong ......... F16C 33/201 29/898.041 |
| 8,746,981 B2 | | 6/2014 | Hartmann |
| 8,882,354 B2 | | 11/2014 | Jaeger et al. |
| 9,022,656 B2 | * | 5/2015 | Burgeff ................ F16C 27/063 384/276 |
| 2003/0012467 A1 | | 1/2003 | Merot et al. |
| 2004/0057643 A1 | | 3/2004 | Blanchard et al. |
| 2004/0213492 A1 | | 10/2004 | Kim et al. |
| 2005/0013519 A1 | | 1/2005 | McDearmon |
| 2005/0070365 A1 | | 3/2005 | Riefe et al. |
| 2006/0251887 A1 | | 11/2006 | Welsch |
| 2006/0276246 A1 | | 12/2006 | Needes et al. |
| 2009/0180720 A1 | | 7/2009 | Weiden et al. |
| 2009/0256341 A1 | | 10/2009 | Okada et al. |
| 2011/0150375 A1 | | 6/2011 | Jaeger et al. |
| 2011/0150377 A1 | | 6/2011 | Hartmann |
| 2011/0176757 A1 | | 7/2011 | Heldmann et al. |
| 2015/0033540 A1 | | 2/2015 | Jaeger et al. |
| 2015/0093066 A1 | | 4/2015 | Speicher et al. |
| 2017/0356494 A1 | * | 12/2017 | Pinnekamp ........... F16C 33/121 |

FOREIGN PATENT DOCUMENTS

| | | |
|---|---|---|
| CN | 1768209 A | 5/2006 |
| CN | 101415959 A | 4/2009 |
| DE | 3613123 A1 | 10/1987 |
| DE | 202005006868 U1 | 8/2006 |
| EP | 0656252 A1 | 6/1995 |
| EP | 1305530 B1 | 3/2005 |
| EP | 1754646 A2 | 2/2007 |
| GB | 821472 A | 10/1959 |
| GB | 2136063 A | 9/1984 |
| GB | 2260338 A | 4/1993 |
| GB | 2402184 A | 12/2004 |
| JP | S6113025 A | 1/1986 |
| JP | S63187747 A | 8/1988 |
| JP | H04236815 A | 8/1992 |
| JP | 6017820 A | 1/1994 |
| JP | H0635643 U | 5/1994 |
| JP | H11115773 A | 4/1999 |
| RU | 2198327 C2 | 2/2003 |
| WO | 2005105431 A1 | 11/2005 |
| WO | 2007113157 A1 | 10/2007 |
| WO | 2007125928 A1 | 11/2007 |
| WO | 2010038137 A1 | 4/2010 |
| WO | 2011073412 A1 | 6/2011 |
| WO | 2011073413 A1 | 6/2011 |
| WO | 2011089145 A1 | 7/2011 |

OTHER PUBLICATIONS

International Search Report for PCT/EP2010/070123, dated Mar. 2, 2011, 2 pages.

International Search Report for PCT/EP2011/050658, dated Apr. 29, 2011, 2 pages.

* cited by examiner

MAINTENANCE-FREE BEARING WITH TOLERANCE COMPENSATION PROPERTIES AGAINST WEAR AND MISALIGNMENT

CROSS-REFERENCE TO RELATED APPLICATION(S)

This application is a divisional and claims priority to U.S. patent application Ser. No. 13/009,035 entitled "MAINTENANCE-FREE BEARING WITH TOLERANCE COMPENSATION PROPERTIES AGAINST WEAR AND MISALIGNMENT," by Joerg Heldmann, Hans-Juergen Jaeger and Alexander Oehrlein, filed Jan. 19, 2011, which application claims priority under 35 U.S.C. § 119(e) to U.S. Patent Application No. 61/296,065 entitled "MAINTENANCE-FREE BEARING WITH TOLERANCE COMPENSATION PROPERTIES AGAINST WEAR AND MISALIGNMENT," by Joerg Heldmann, Hans-Juergen Jaeger and Alexander Oehrlein, filed Jan. 19, 2010, of which both applications are assigned to the current assignee hereof and incorporated herein by reference in their entirety.

BACKGROUND

Field of the Disclosure

The invention relates in general to bearings and tolerance rings and, in particular, to an improved system, method and apparatus for a maintenance-free bearing assembly with tolerance compensation properties against wear and misalignment.

Description of the Related Art

Bearings and tolerance rings constrain movement between parts that move relative to each other, such as rotating shafts in housing bores. An example of such a structure is an annular band located in the gap between the outer surface of a shaft and the inner surface of a bore. This tolerance ring limits radial or axial motion of the shaft within the bore while still permitting relative movement.

In conventional designs, a close fit is sought between the inner and outer components. In addition, either forces for providing maximal frictional engagement or minimal variation in sliding forces are sought. A close fit between the components is desirable because it reduces relative vibration between the parts. Tolerance rings are able to compensate for tolerances or misalignments, create torque and can improve other properties, such as noise, vibration and harshness properties. Such properties and torque are mainly influenced by the material properties of common tolerance rings, which are usually formed only from stainless or carbon steel. These requirements between the inner and outer components require strong and substantial contact, which increases frictional forces.

For example, a conventional bushing 31 (FIG. 3A) comprising a backing layer 33 and plastic compound 35 is located between a pin 37 and housing 39. When a significant force F (exaggerated in FIG. 3B) is applied to the pin 37, the bushing 31 is deformed and excessively worn, and undesirable contact or uneven friction occurs between the pin 37 and backing layer 33. Although these solutions are workable for some applications, improvements in bearings and tolerance rings continue to be of interest.

SUMMARY OF THE INVENTION

Embodiments of a system, method and apparatus for bearings and tolerance rings for a maintenance-free assembly with tolerance compensation properties against wear and misalignment are disclosed. For example, a system for elastically compensating for wear, thermal expansion and misalignment comprises a ring located between a housing and a pin in the bore of the housing. The ring has a backing layer, an expanded grid structure having a plurality of openings, a low friction layer penetrated into the openings of the expanded grid structure, and may additionally comprise one layer of adhesive for bonding the backing layer and/or a second layer of adhesive for bonding the low friction layer to the expanded grid. Together, the expanded grid structure and the low friction layer provide elastic deformation of the ring between the housing and pin.

The expanded grid structure may comprise a stretched metal, expanded metal, metal alloy or plastic material, or a woven or nonwoven mesh. The low friction layer is laminated into the expanded grid structure. In addition, the expanded grid structure may have a wave-like configuration with strands protruding as bulges out of a plane thereof to form a pattern of waves and bow springs to provide elastic deformation under load. The expanded grid structure may be completely or only partially embedded into the low friction layer such that portions of the expanded grid structure protrude from the low friction layer and contact the pin.

The ring provides sliding properties and tolerance compensation for production tolerances, clearance tolerances, torque tolerances, material differences, temperature differences, load variation, dynamic behavior, and wear between components. The ring further provides at least one of radial and axial elastic deformation. When a force is applied to the pin, the expanded grid structure compresses in some areas and expands in other areas to compensate for wear and misalignment around a complete circumference of the ring.

BRIEF DESCRIPTION OF THE DRAWINGS

The present disclosure may be better understood, and its numerous features and advantages made apparent to those skilled in the art by referencing the accompanying drawings.

DETAILED DESCRIPTION

Figure 1B:
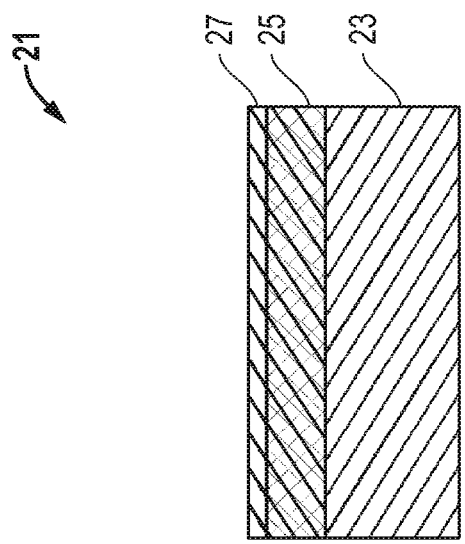
FIGS. 1A and B are exploded and assembled sectional side views, respectively, of one embodiment of a laminate material.
Figure 1A:
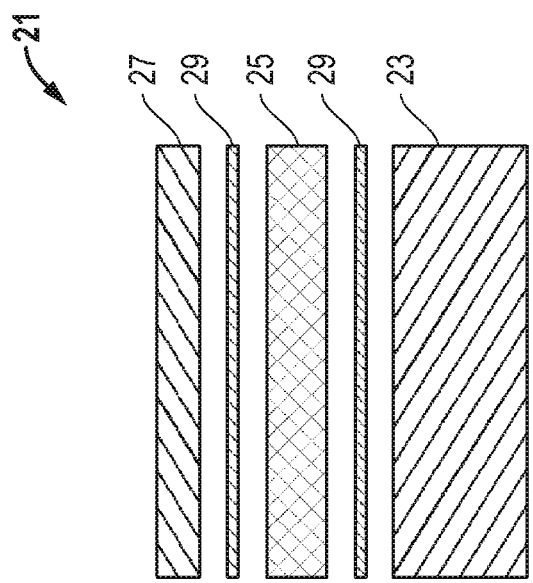
Figure 2A:
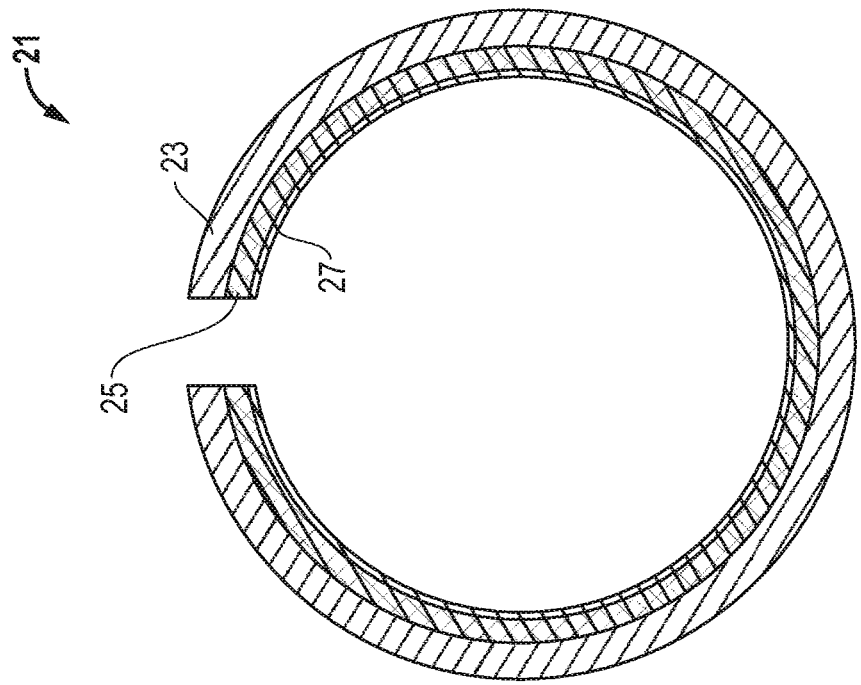
FIGS. 2A and B are sectional side views of embodiments of bushings constructed from the laminate of FIGS. 1A and B.
Figure 2B:
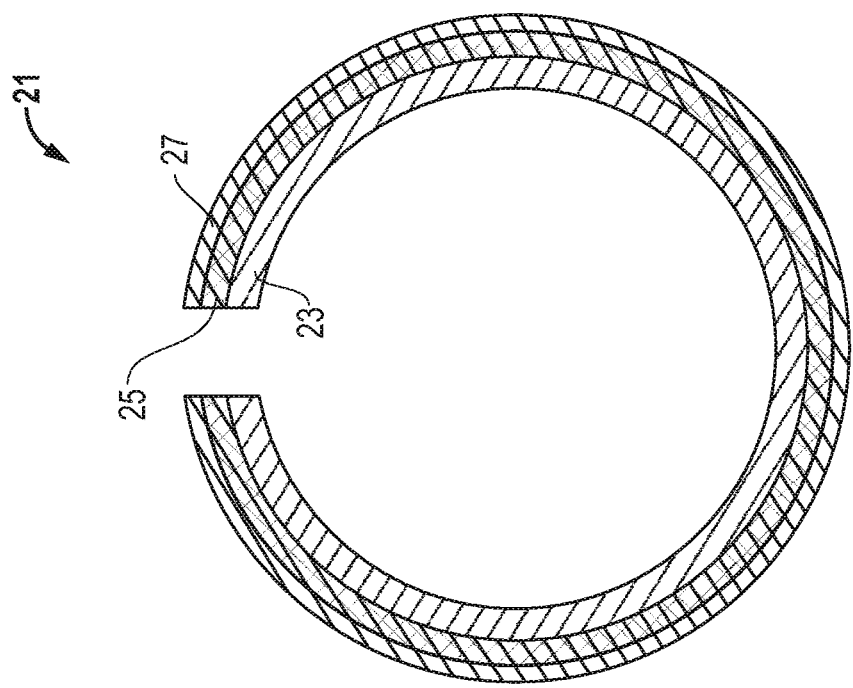
Figure 3A:
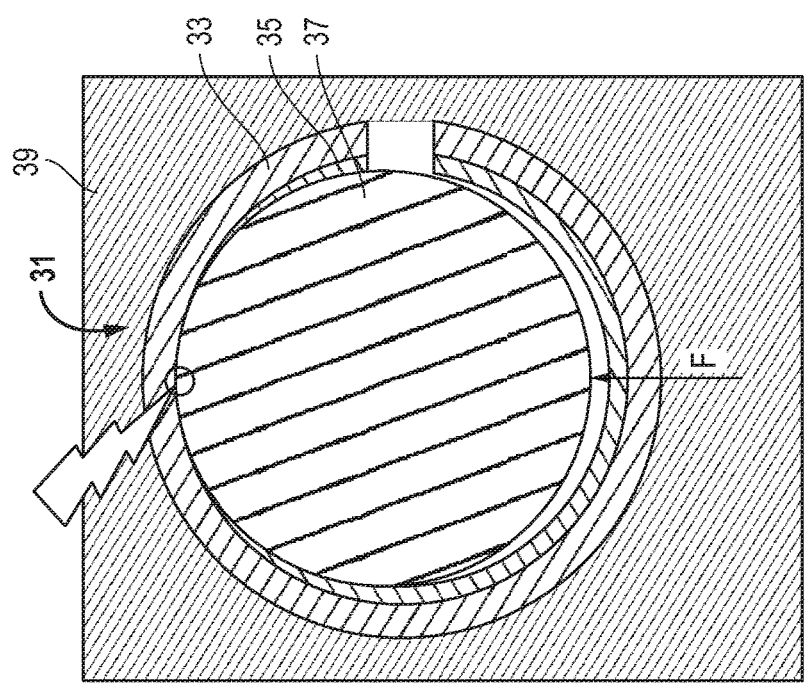
FIGS. 3A and B are sectional side views of a conventional bushing in operation.
Figure 3B:
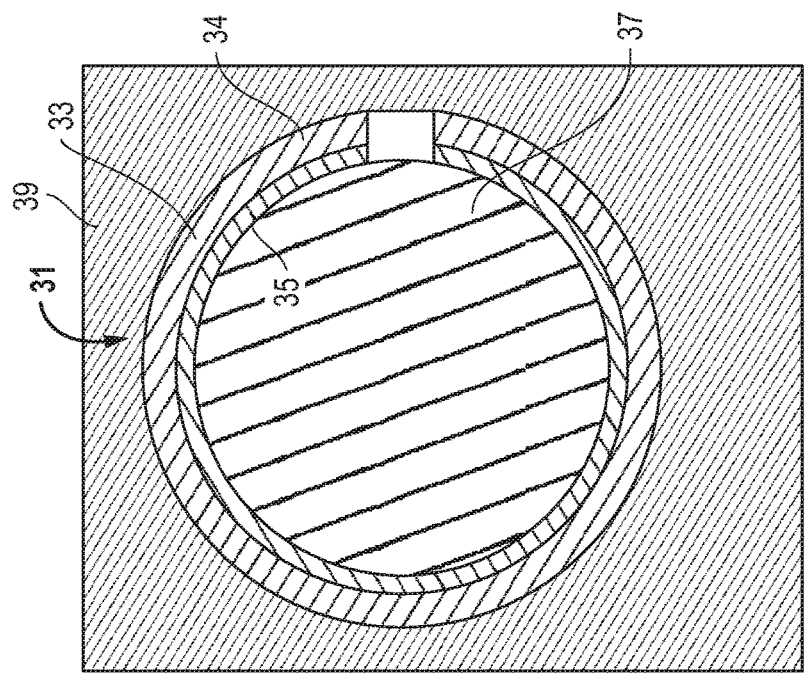

Embodiments of a system, method and apparatus for bearings and tolerance rings for a maintenance-free ring assembly with tolerance compensation properties against wear and misalignment are disclosed. For example, FIGS. 1A and B depict a laminate for a bearing or tolerance ring assembly 21 having a backing layer 23, an expanded grid structure 25 and a low friction layer 27, such as a tape. Depending on laminate set up, material layers of melt adhesive 29 may be located between these components to bond them together. During assembly, the low friction layer 27 penetrates the expanded grid structure 25, as shown in FIG. 1B. In some embodiments, the laminate may be formed into a ring with the low friction layer 27 facing radially outward (FIG. 2A) or inward (FIG. 2B).

In other embodiments, one of the layers of the melt adhesives 29 (FIG. 1A) may be omitted, provided the other one penetrates through the expanded grid structure 25 and immerses both sides of the expanded grid structure so as to induce adhesion on both sides (i.e., grid structure 25 to both tape 27 and backing layer 23).

In still other embodiments, both melt adhesive layers 29 (FIG. 1A, without layers 29) may be omitted, provided adhesion of the low friction layer to the expanded grid (and/or to the backing material) and adhesion from the expanded grid to the backing material is ensured by alternate means.

In some embodiments, the backing layer 23 is steel, stainless steel, a plain steel alloy, or another metal alloy and has a thickness in a range of about 0.01 mm to 5 mm. The grid structure 25 may be formed from stainless steel, spring steel, aluminum, bronze or other metal alloys, thermoplastic or ceramic material, and has a thickness in a range of about 0.05 mm to 2 mm. The low friction layer 27 may comprise a plastic compound layer, such as PTFE or other materials as described herein, and may contain organic, inorganic, metallic or plastic fillers. The low friction layer may be laminated on top of and embedded into the grid structure, and has a thickness in a range of about 0.01 mm to 1 mm.

In still other embodiments, the low friction layer 27 may comprise materials including, for example, a polymer, such as a polyketone, polyaramid, a thermoplastic polyimide, a polyetherimide, a polyphenylene sulfide, a polyethersulfone, a polysulfone, a polyphenylene sulfone, a polyamideimide, ultra high molecular weight polyethylene, a fluoropolymer, a polyamide, a polybenzimidazole, or any combination thereof. In an example, the thermoplastic material includes a polyketone, a polyaramid, a polyimide, a polyetherimide, a polyamideimide, a polyphenylene sulfide, a polyphenylene sulfone, a fluoropolymer, a polybenzimidazole, a derivation thereof, or a combination thereof. In a particular example, the thermoplastic material includes a polymer, such as a polyketone, a thermoplastic polyimide, a polyetherimide, a polyphenylene sulfide, a polyether sulfone, a polysulfone, a polyamideimide, a derivative thereof, or a combination thereof. In a further example, the material includes polyketone, such as polyether ether ketone (PEEK), polyether ketone, polyether ketone ketone, polyether ketone ether ketone, a derivative thereof, or a combination thereof. An example fluoropolymer includes fluorinated ethylene propylene (FEP), PTFE, polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), or any combination thereof. In an additional example, the thermoplastic polymer may be ultra high molecular weight polyethylene.

Lubrication of the sliding surface may be used in high force applications. Exemplary lubricants may include oil, grease, or solid lubricants such as molybdenum disulfide, tungsten disulfide, graphite, graphene, expanded graphite, boron nitride, talc, calcium fluoride, cerium fluoride, or any combination thereof. An exemplary ceramic or mineral includes alumina, silica, titanium dioxide, calcium fluoride, boron nitride, mica, Wollastonite, silicon carbide, silicon nitride, zirconia, carbon black, pigments, or any combination thereof.

The performance of the bearing material also is affected by selection of the parameters of the three-dimensional, expanded grid structure 25. The grid structure 25 can be a stretched or expanded metal, metal alloy (e.g., spring steel) or plastic material, or a woven or nonwoven mesh (e.g., with welded contact points like Norglide® M) or any other woven or nonwoven net, grid or mesh structure with compensating properties. This structure has defined geometry and mechanical properties. The grid structure is embedded in a plastic material, such as PTFE by laminating, spraying or calendaring and sintering (or any other method for applying plastic material to the grid structure) on and/or around the grid structure.

A number of parameters of the grid structure may be selected and adjusted based on the application. The parameters include the three-dimensional structure of the expanded grid, the material it is formed from, and the backing and design of grid with respect to the substrate (if metal or other material backed) or to the housing. The processing into an expanded grid involves cutting of the raw material sheet and deforming or pulling the resulting grid. Because the cut strands of the sheet are torn during processing, the single strands of the grid twist and form bulges in every row of the expanded grid, and then protrude perpendicularly out of a plane defined by the expanded grid. The bulges form a three-dimensional structure together with the two-dimensional expanded grid mesh geometry.

In alternate embodiments, a structure similar in function to an expanded grid structure may be produced by a variety of other processes, such as extrusion, encapsulation, three-dimensional printing, etc., which may be more costly than the cutting and expansion process.

In some embodiments (see, e.g., FIG. 5), the three-dimensional structure 25 has a wave-like appearance. The strands 51 protrude as bulges 53 out of the plane of the sheet form waves and appear like bow springs 55 while providing for an elastic and plastic behavior of the entire laminate. Accordingly, the laminate can be used in situations where a spring-like behavior is desired over a very short distance (i.e., small deformations of the laminate), or in situations where tolerances need to be compensated.

In some applications the deformation may be characterized in terms of a percentage of the diameter of the bearing or tolerance ring. For example, for a bearing having a 10 mm diameter, the low friction layer may compensate for about 5 to 20µ of elastic deformation, and up to about 0.1 to 0.2 mm of compensation for the overall assembly with the grid structure for 100% elastic recovery. This design is particularly useful for applications such as bushings formed from the laminate.

A ring formed with a PTFE-compound laminate in accordance with some embodiments of the invention, compensates for tolerances in workmanship or application between a housing and shaft assembly, particularly between the bearing surface and the shaft. The bushing then not only provides gliding and/or sliding properties to the assembly, but also tolerance compensation regarding production tolerances, clearance tolerances, torque tolerances, material or temperature differences, load variation or dynamic behavior, aging or wear between assemblies parts, or any combination of these.

The compensation primarily occurs in the radial direction but is not so limited, as axial compensation also may be provided. For example, if the bushing has an additional flange, tolerance compensation can also be provided in axial direction with the main working principles being the same as in the radial case.

Depending on the clearance, the laminate of the bushing is compressed to a certain degree during assembly or application, and stays in this form throughout the life of the assembly or application. Should the tolerance of the assembly change over time (e.g., through deformation of the housing), then the elastic portion of the behavior of the laminate accommodates such changes.

Figure 4B:
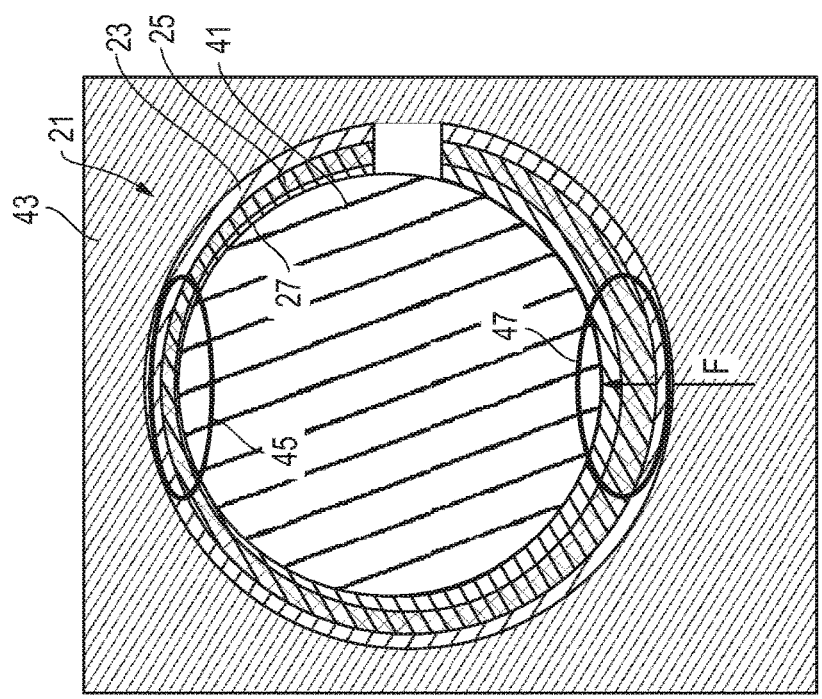
FIGS. 4A and B are sectional side views of the embodiment of FIG. 2B in operation.
Figure 4A:
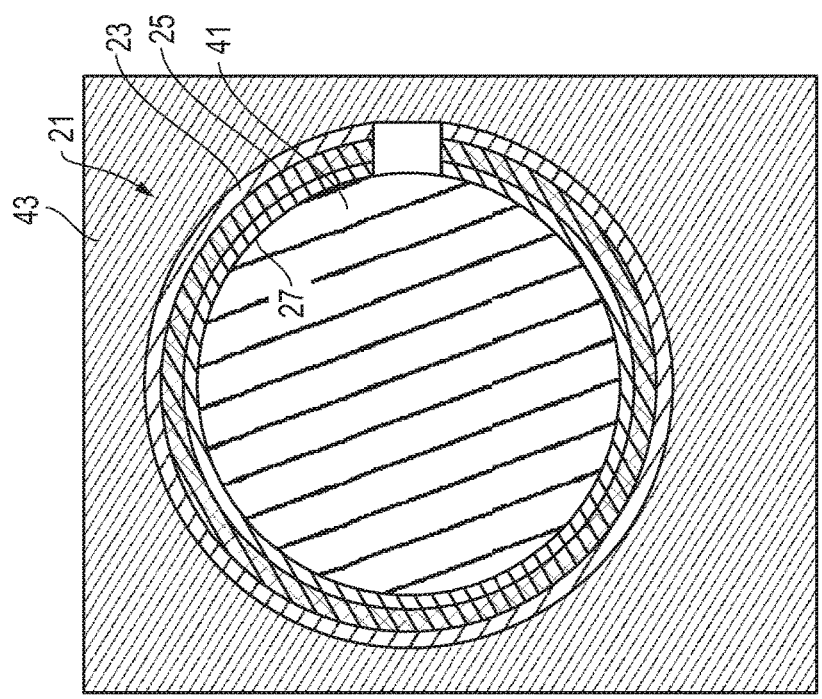

For example, comparing FIGS. 4A and 4B, bushing 21 is located in a bore between a coaxial pin 41 and housing 43. Applying force F to the pin 41 causes the expanded grid structure 25 to compress in some areas 45 (i.e., opposite force F, and shown exaggerated for clarity), and expand in other areas 47 to better compensate for wear and misalignment.

The tolerance compensating material has several functional movements. These include compensation of tolerances, acting under load as a spring, compensation of thickness variations due to temperature differences or thickness changes (e.g., due to wear during application; see, e.g., FIGS. 9A-C) or compensation of torque differences.

To achieve these compensations, the laminate and tolerance compensating material may be designed in many ways. The grid structure may be partly embedded into the low friction material. Along with the low friction material, the peaks or other portions of the grid structure may protrude from the embedding material and contact the shaft in application or after assembly, whether or not under load. Alternatively or in combination, other peaks or portions of the grid structure may contact the backing material or housing without completely engaging the entire surface of the backing material or housing.

The material can be compressed with such compositions. During embedding, the embedding material moves into volumes of the grid structure where there is no grid structure, such as voids, air bubbles or where there is a softer, more compressible material than the expanded grid.

In other embodiments, the grid structure may be completely embedded in the low friction material and has complete contact with the backing material or housing. In this case the grid structure is compressed while staying embedded completely. The entire composite of grid and surrounding low friction material is deformed and relaxes after unloading completely or partially.

The plastic and elastic part of the behavior of the laminate can be tailored by several parameters. For example, performance is affected by material selection of the expanded grid material, low friction layer and filler types, as well as the backing material. The backing material also may comprise several alloys or represent a material composite. The respective thicknesses of the expanded grid structure, backing material and plastic compound also affect performance.

Figure 5:
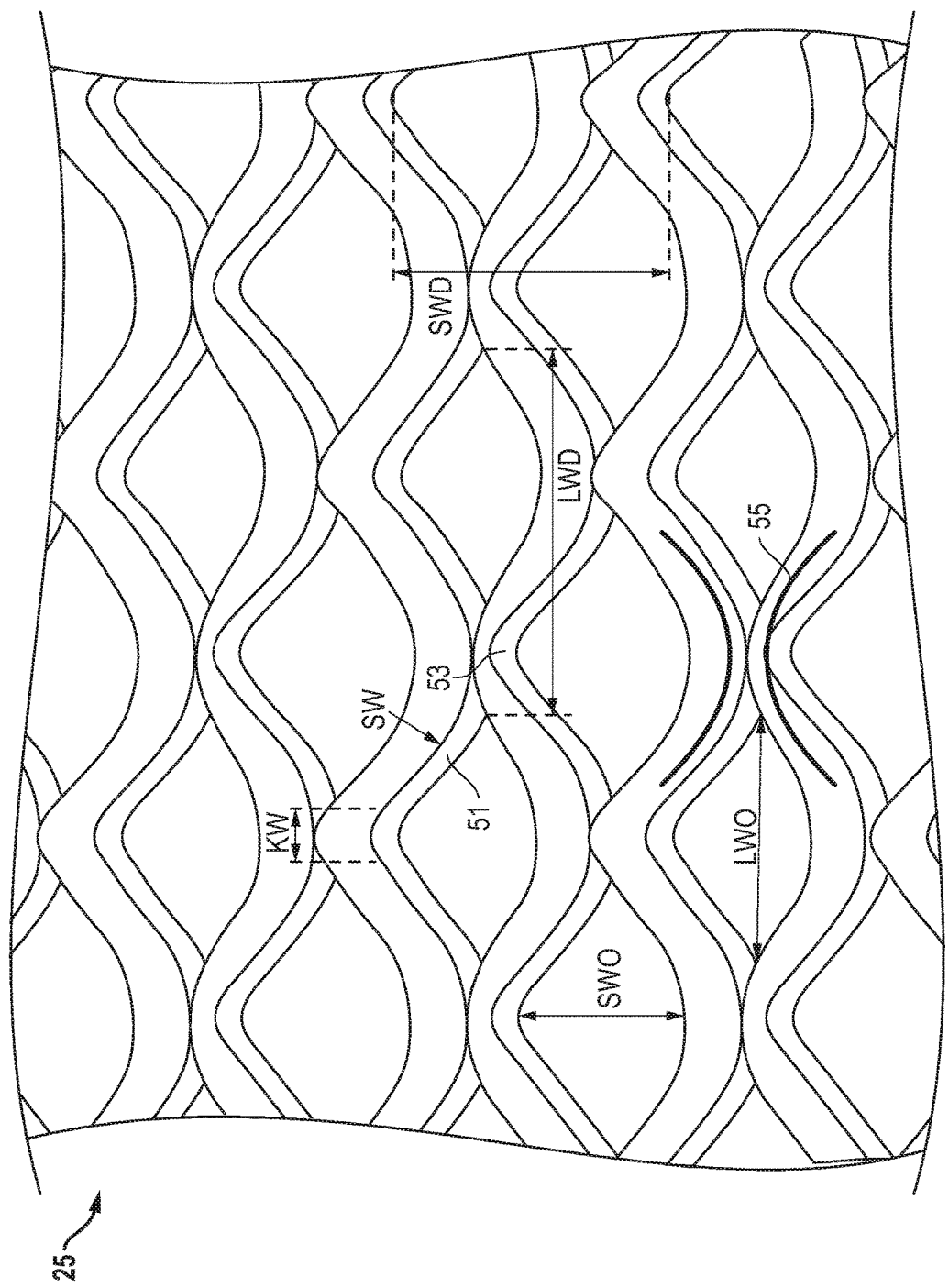
FIG. 5 is a magnified top view image of a grid structure.

In addition and again as shown in FIG. 5, other dimensions may be selected such as long way of the diamond (LWD; or horizontal distance between reference points in the same row) and short way of the diamond (SWD; or vertical distance between reference points in the same column) in the geometric, two-dimensional parameters of the expanded grid structure. Reducing the thickness of the expanded grid by flattening it increases its stiffness in the out-of-plane direction. Other variables include selection of horizontal and vertical in-plane distance between adjacent structural openings, such as mesh opening, knot width (KW) and strand width (SW) versus LWD/SWD, long way of opening (LWO), short way of opening (SWO) as well as selection of the direction in which the expanded grid is laminated into the laminate and eventually deployed.

In some embodiments, a stiffer laminate may be formed by reducing the relation of transverse mesh opening to LWD, and/or the longitudinal mesh opening to SWD. Other options include increasing the strand thickness and/or knot width, flattening the expanded grid, increasing the raw material sheet thickness, and/or increasing the expanded grid material hardness and/or tensile strength.

Figure 6:
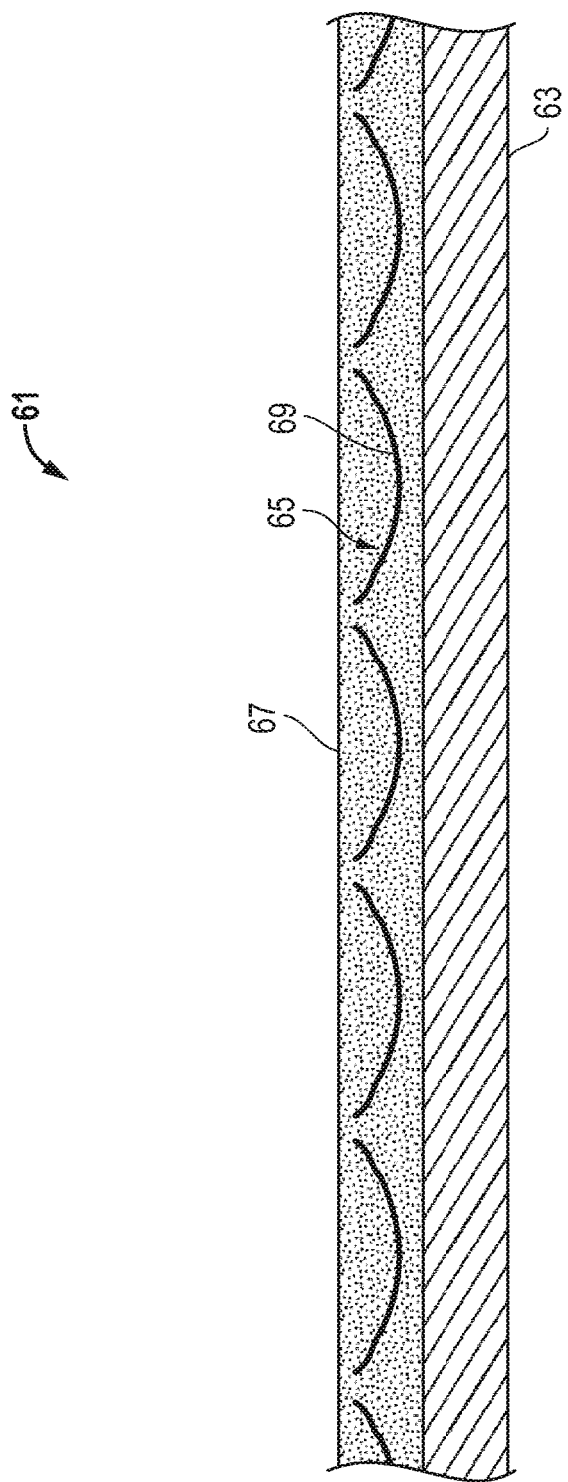
FIG. 6 is a sectional side view of another embodiment of a laminate.

FIG. 6 depicts another embodiment of laminate assembly 61 for bushings and tolerance rings. Assembly 61 has a backing layer 63, grid structure 65 and low friction layer 67. The low friction layer 67 fully encapsulates the grid structure 65 and is bonded to backing layer 63. In this embodiment, the low friction layer 67 has smooth surfaces with no additional structure. The grid structure 65 comprises a large plurality of concave features 69 that can be compressed under load, providing semi-elastic behavior in radial and/or axial directions of a bushing.

Figure 7:
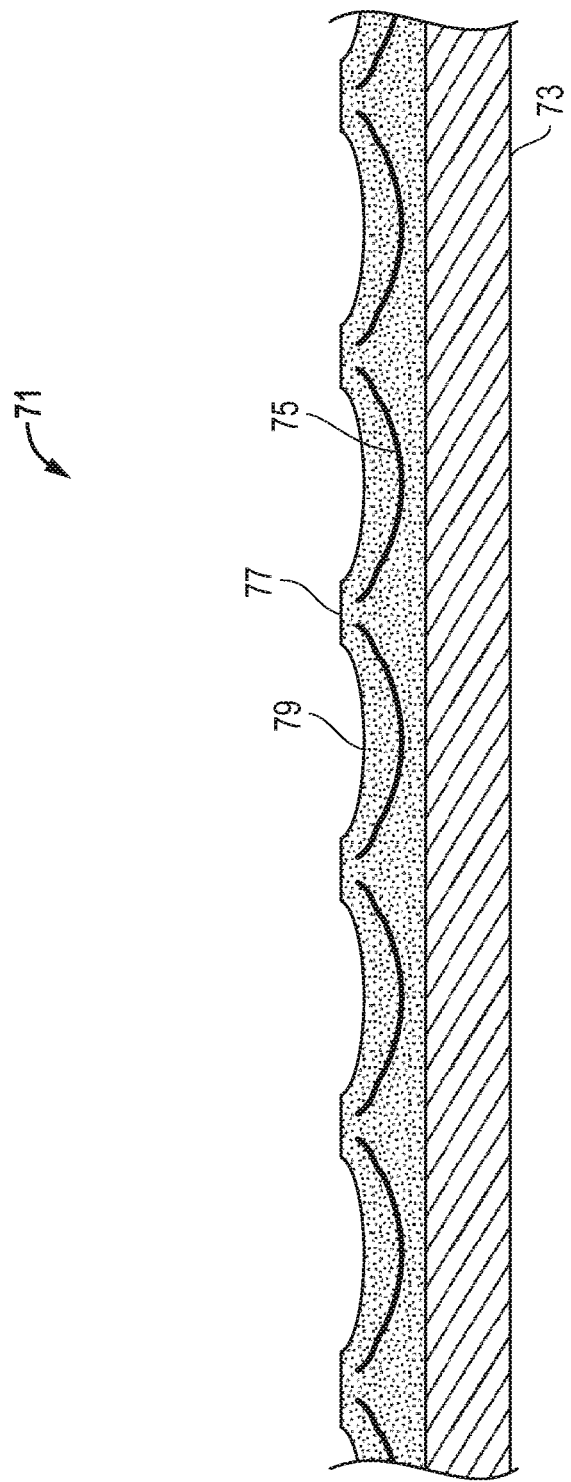
FIG. 7 is a sectional side view of still another embodiment of a laminate.

FIG. 7 depicts still another embodiment of a laminate assembly 71 having a backing layer 73, grid structure 75 and low friction layer 77. The low friction layer 77 encapsulates the grid structure 75 and is bonded to backing layer 73. In this embodiment, the low friction layer 77 has an undulated surface with recesses 79 that align with and are complementary to the concave elements of grid structure 75, but which face away from backing layer 73.

Figure 8:
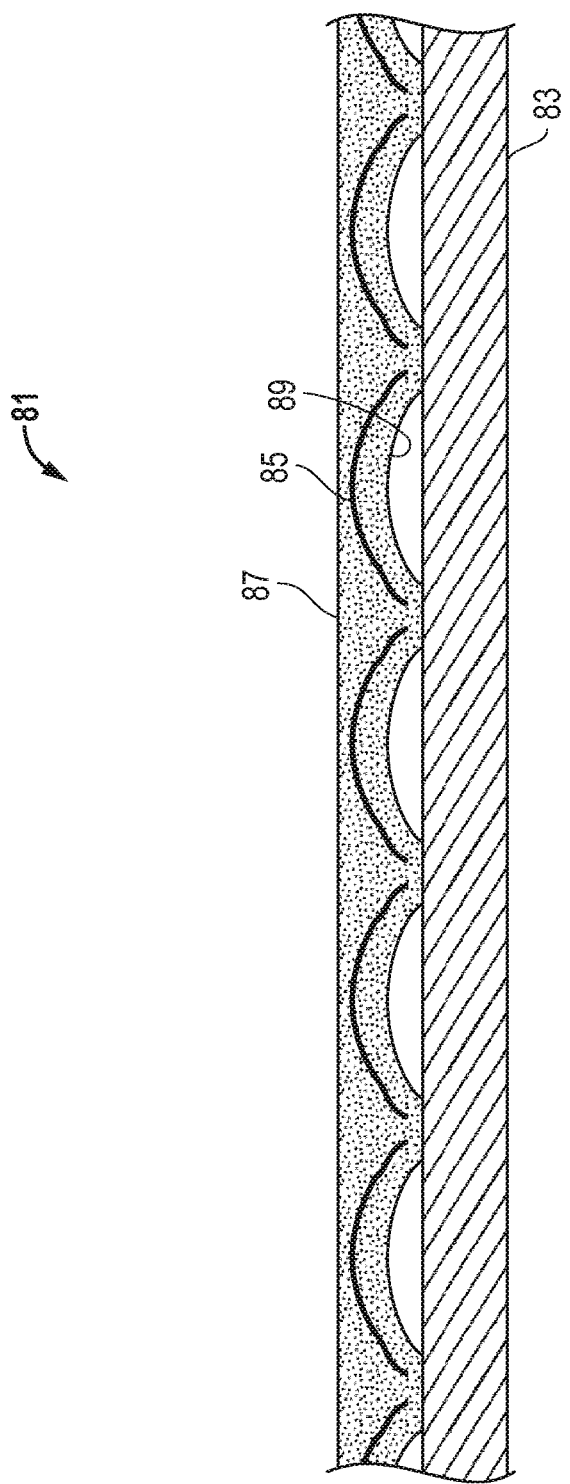
FIG. 8 is a sectional side view of a different embodiment of a laminate.

An inverted version of the prior embodiment appears in FIG. 8, wherein the recesses 89 and concave elements of grid structure 85 face toward the backing layer 83 of laminate assembly 81 to form air pockets or voids therebetween. Both grid structures 75, 85 and the recesses 79, 89 can be compressed under load volume, in radial and/or axial directions, to provide elastic behavior in operation and readily compensate for wear and misalignment.

Figure 9A:
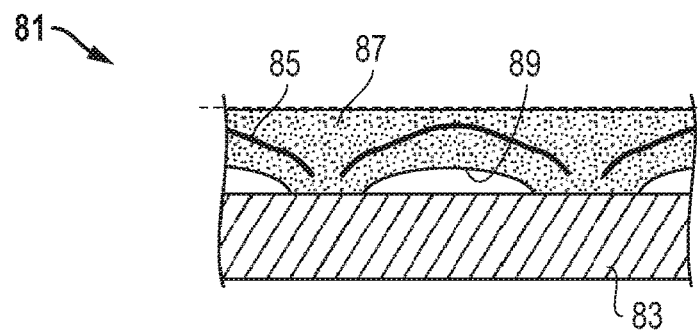
FIGS. 9A-C are sequential sectional side views of the laminate embodiment of FIG. 8 during operation.
Figure 9B:
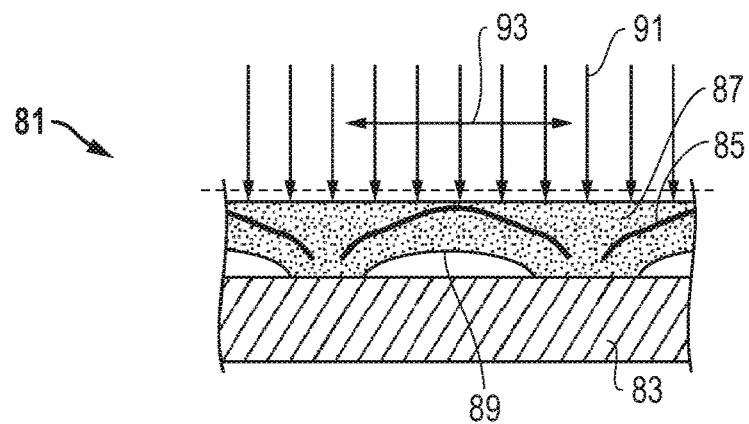
Figure 9C:
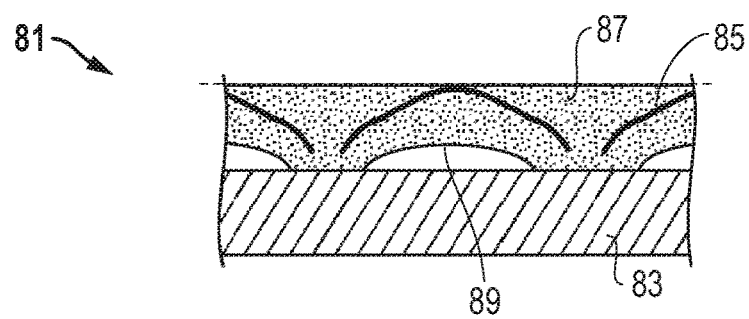

For example, FIG. 9A illustrates assembly 81 unloaded as a bearing or tolerance ring and at an original dimension or thickness. In FIG. 9B, the bearing or tolerance ring wears under load 91 and sliding speed 93, causing a reduction in the thickness of low friction layer 87, as shown. However, the bearing or tolerance ring is self-adjusting (FIG. 9C) during the application as grid structure 85 compensates for wear by returning the assembly to the original dimension as in FIG. 9A.

Figure 10A:
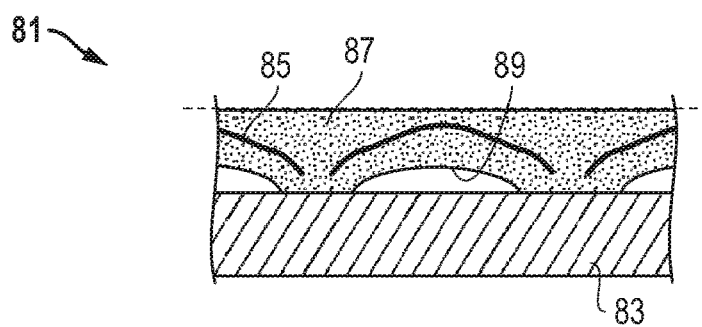
FIGS. 10A-C are sequential sectional side views of the embodiment of FIG. 8 during another type of operation.
Figure 10B:
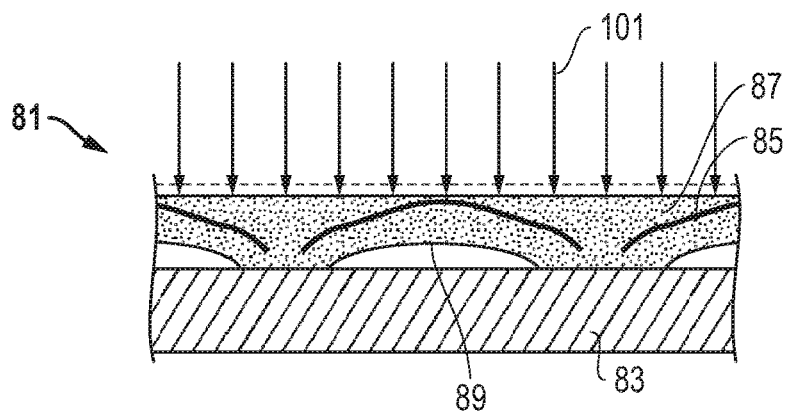
Figure 10C:
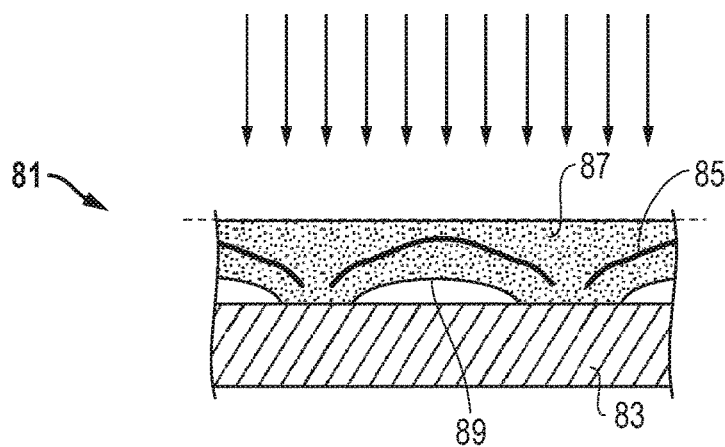

Analogously, FIG. 10A illustrates assembly 81 unloaded as a bearing or tolerance ring. In FIG. 10B, the bearing or tolerance ring is under load 101, causing the grid structure 85 and recesses 89 of low friction layer 87 to deform, as shown. The bearing or tolerance ring is self-adjusting (FIG. 10C) during the application as assembly 81 compensates for the deformation and returns to the original dimension as in FIG. 10A. Load 101 may represent the elevated thermal expansion (or contraction) of the shaft and/or housing, in which case the assembly compresses and then returns to its original thickness after cooling to ambient temperatures.

Figure 14A:
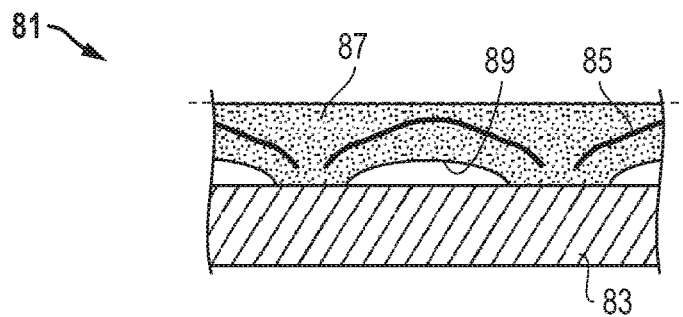
FIGS. 14A-C are sequential sectional side views of the embodiment of FIG. 8 during another type of operation.
Figure 14B:
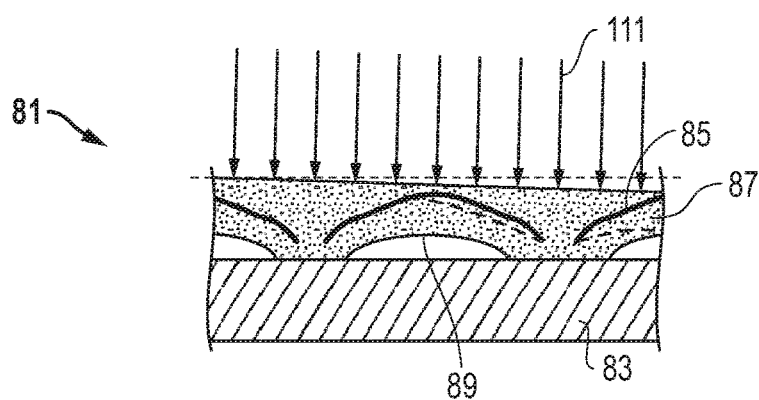
Figure 14C:
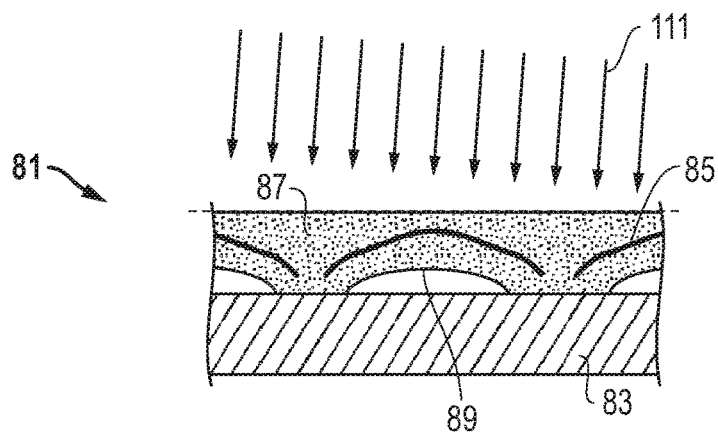

Similarly, FIG. 14B represents the application of a misaligned load 111 to assembly 81, and the structure before (FIG. 14A) and after (FIG. 14C) application of misaligned load 111. During application of the misaligned load 111 (FIG. 14B), the volumes or holes in the structure are compressed and the grid acts as a spring locally (i.e., on one side of the bearing/tolerance ring as represented by the dashed line. After relaxation (FIG. 14C), the bearing material relaxes and the thickness locally returns to the original level.

The grid structure 85 may be configured such that the peaks of the structure are deformed from the original position (FIG. 10A) under pressure 101 (FIG. 10B) in different bearing applications, and return to their original position (FIG. 10C) after relaxation or after removal of the load 101.

Figure 12:
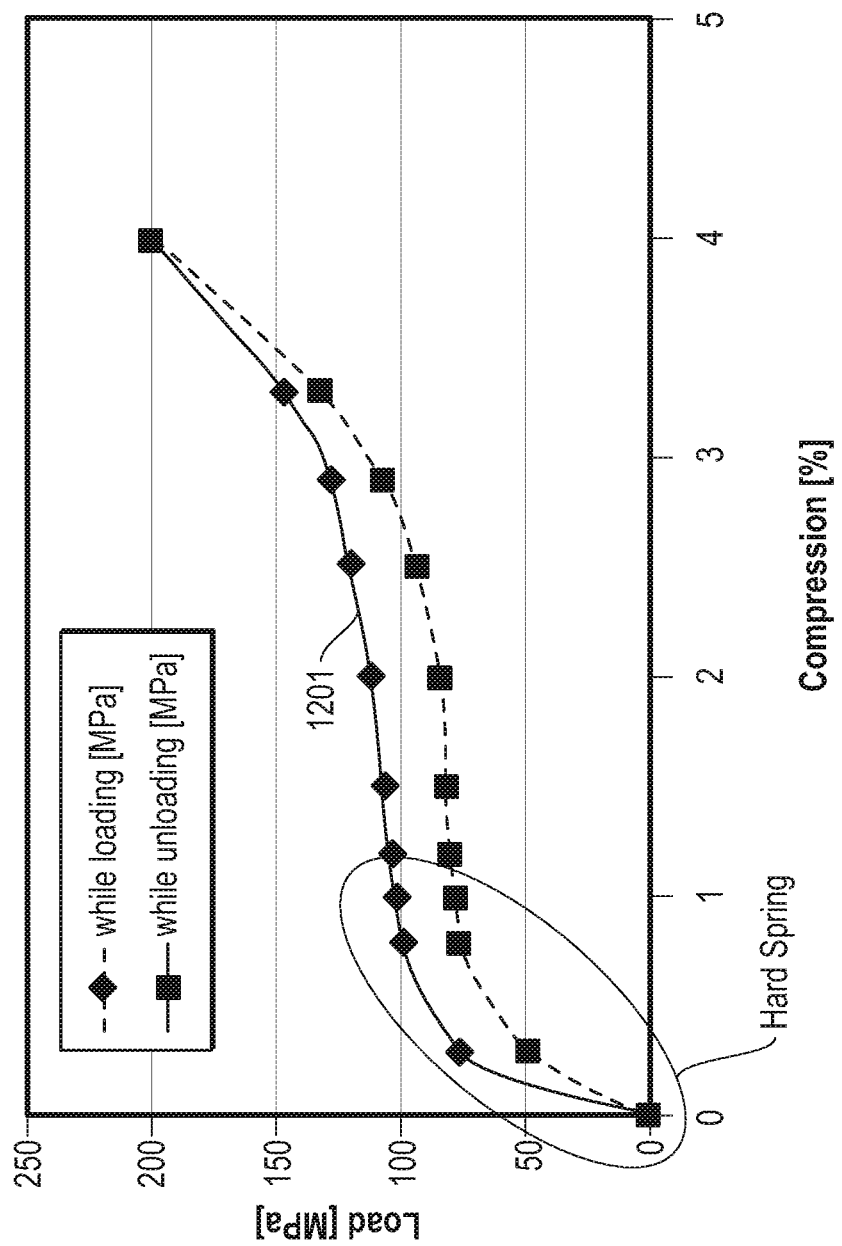
Figure 13:
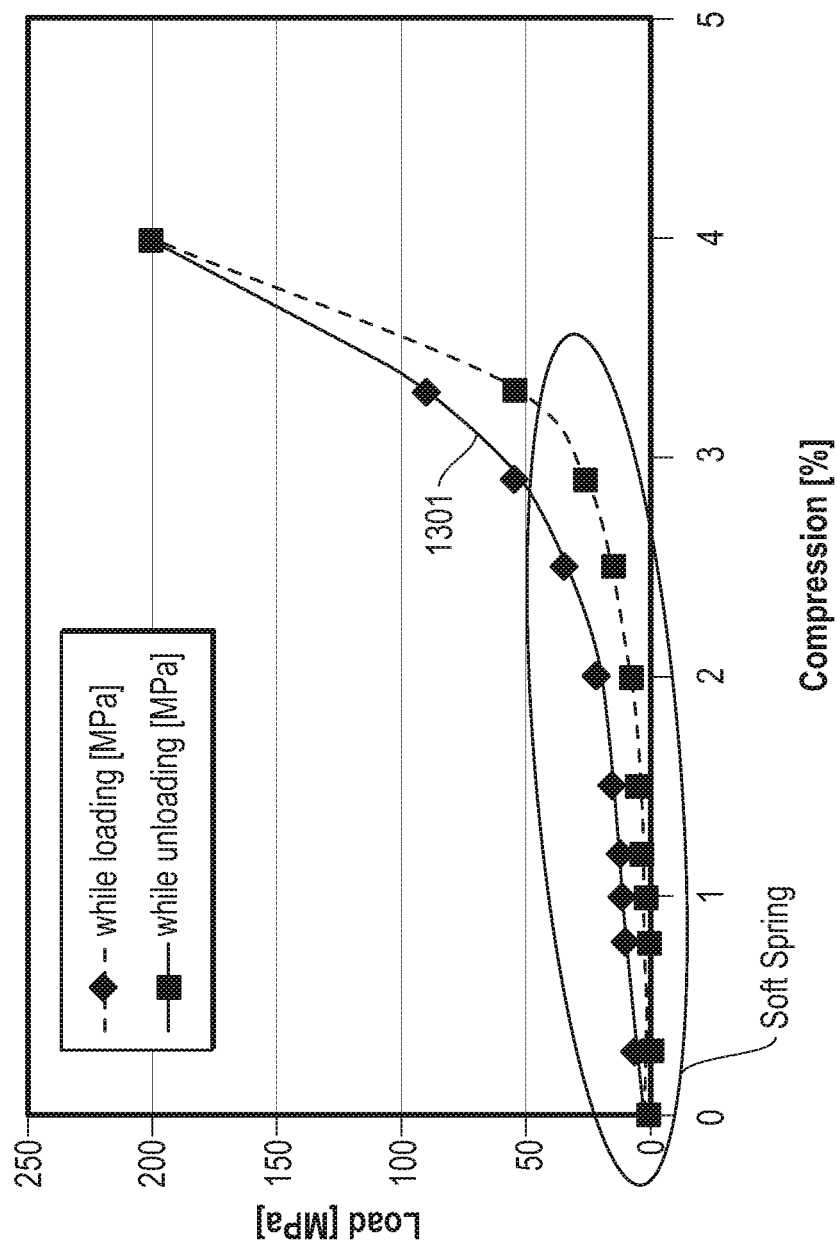

In force-elongation diagrams (see, e.g., FIGS. 11-13) there is almost no plastic deformation exhibited inside a typical range of loads and deformation for tolerance rings or sliding bearings. This fully elastic behavior also permits adjustment of the bearing or tolerance ring, although the functional surface does wear during its life time of use. Throughout its life time, the surface of the functional layer always remains at the same position. For example, the inner diameter of a bearing or tolerance ring is constant over its life time and under all application conditions.

In other embodiments, the geometry of the expanded structure is configured such that the peaks do not return to their original position (i.e., they plastically deform) but overall the ring assembly still maintains elastic behavior. This design may be used for tolerance compensation during the life time of a ring assembly or during the sizing procedure after its manufacture.

Figure 11:
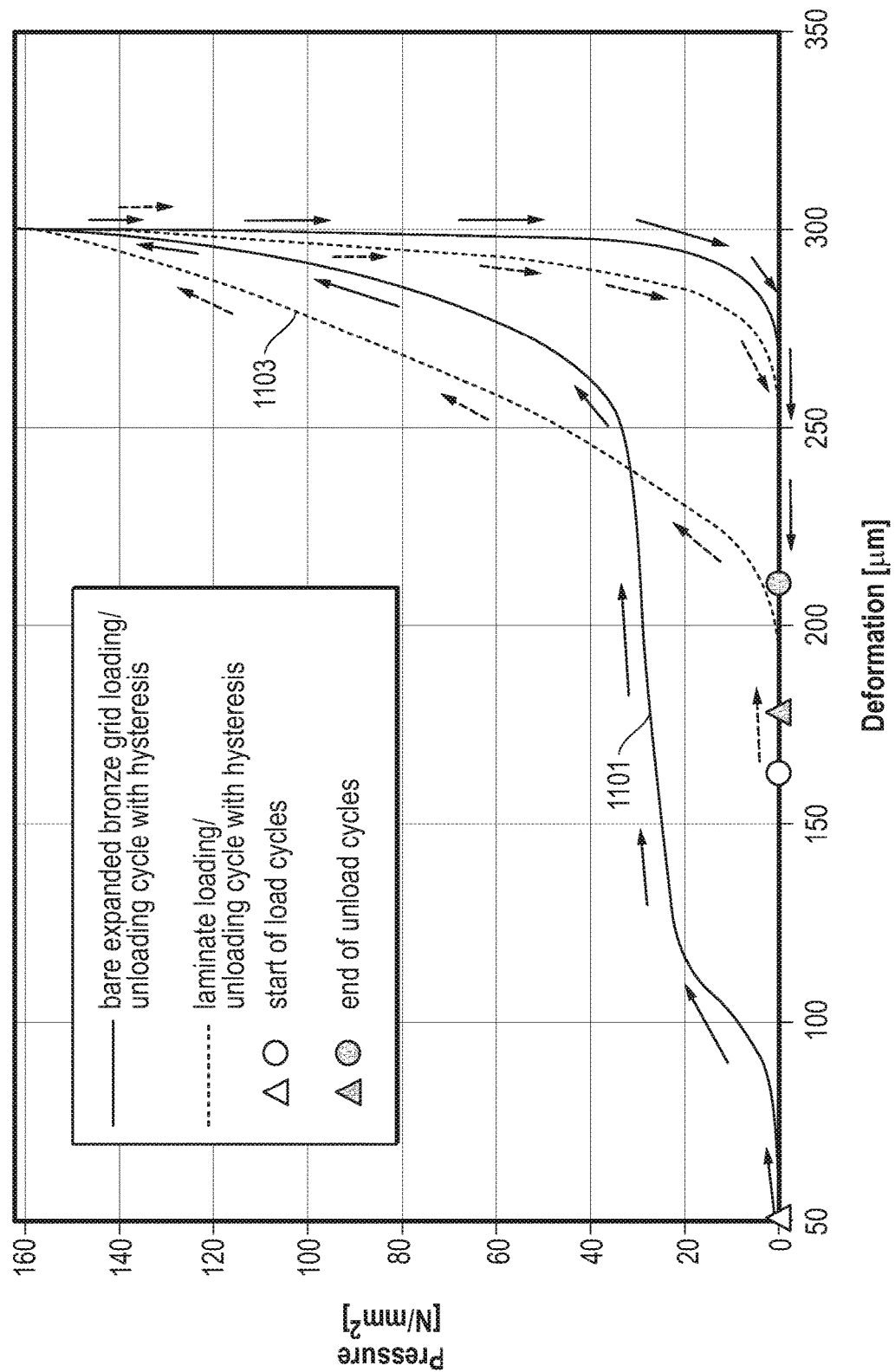
FIGS. 11-13 are plots of load and unload cycles for various embodiments of bearing components.

Referring again to FIGS. 11-13, the elastic and plastic behavior of the laminate under an applied load is depicted. These illustrate an exemplary load appearing in, for example, a maintenance-free automotive bearing application. In FIG. 11, two typical loading/unloading cycles 1101, 1103 are measured with increasing/decreasing pressure on an expanded bronze grid and on a laminate, respectively, containing the same expanded grid structure. The bare expanded bronze grid yields a higher resulting deformation (i.e., deformation difference between start of loading cycle and end of unloading cycle) than the laminate. This difference results from the forces during lamination, which pre-compress the expanded bronze grid so that the laminate has a lower overall deformation when subjected to the same pressure conditions. Arrows facing upwards or to the right represent the loading phase, arrows facing downwards or to the left represent the unloading phase. The maximum applied load in these tests was 157.5 N/mm$^2$. Likewise, the plots 1201 and 1301 in FIGS. 12 and 13, respectively, illustrate elastic behavior for both hard spring and soft spring requirements.

In some embodiments, the invention comprises a system for elastically compensating for wear and misalignment. A ring such as a bushing, bearing or tolerance ring is located between the housing and pin in the bore of the housing. The ring comprises a backing layer, an expanded grid structure having a plurality of openings, a low friction layer penetrated into the openings of the expanded grid structure, and at least one layer of adhesive for bonding the backing layer, expanded grid structure and low friction layer together to provide elastic deformation of the ring between the housing and pin. The at least one layer of adhesive may comprise a pair of layers of melt adhesive that penetrate through the expanded grid structure and immerse sides of the expanded grid structure to both the backing layer and the low friction layer.

In other embodiments, the backing layer may comprise one of steel, stainless steel and a plain steel alloy, and has a thickness in a range of 0.01 mm to 5 mm, the grid structure may comprise one of stainless steel, spring steel, aluminum, bronze, thermoplastic and ceramic material, and has a thickness in a range of 0.05 mm to 2 mm. The low friction layer may comprise a plastic compound with organic, inorganic, metallic or plastic fillers, and has a thickness in a range of 0.01 mm to 1 mm.

The expanded grid structure may comprise at least one of a stretched metal, expanded metal, metal alloy and plastic material, and the low friction layer is laminated into the expanded grid structure. The expanded grid structure also may comprise a cut raw material sheet having rows that are deformed with cut strands that are twisted and form bulges in every row. The bulges protrude out of a plane defined by the expanded grid structure.

In addition, the expanded grid structure may have a wave-like configuration with strands protruding as bulges out of a plane thereof to form a pattern of waves and bow springs to provide elastic deformation under load. The expanded grid structure may be completely or only partially embedded into the low friction layer such that portions of the expanded grid structure protrude from the low friction layer and contact the pin. The elastic deformation may be characterized in terms of a percentage of a diameter of the ring, and the ring is a split ring. For example, for a ring having a 10 mm diameter, the low friction layer compensates for 5 to 20μ of elastic deformation, and overall the ring compensates for 0.1 to 0.2 mm of elastic deformation.

The ring provides sliding properties and tolerance compensation for production tolerances, clearance tolerances, torque tolerances, material differences, temperature differences, load variation, dynamic behavior, and wear between components. The ring further provides at least one of radial and axial elastic deformation. When a force is applied to the pin, the expanded grid structure compresses in some areas and expands in other areas to compensate for wear and misalignment around a complete circumference of the ring.

In some embodiments, a geometry of the expanded grid structure is selected and patterned by dimensions of the openings with long way of the diamond (LWD), short way of the diamond (SWD), thickness, horizontal and vertical in-plane distance between adjacent openings, mesh openings, knot width and strand width versus LWD/SWD, thickness of a single strand (TSS; material thickness before expansion), total grid thickness (TGT; material thickness after expansion), and selection of a direction in which the expanded grid structure is laminated and deployed.

The ring may be made stiffer by reducing a relation of transverse mesh opening to LWD, longitudinal mesh opening to SWD, increasing a strand thickness or knot width, flattening the expanded grid structure, increasing a thickness of a raw material sheet, and increasing a hardness or tensile strength of the expanded grid structure.

The low friction layer may be provided with smooth surfaces with no additional structure, and the expanded grid structure comprises a plurality of concave features that are compressible under load. Alternatively, the low friction layer may have an undulated surface with recesses that align with and are complementary to concave elements of the expanded grid structure. The recesses may face away from or toward the backing layer, and both the expanded grid structure and the recesses are compressible under load to provide elastic behavior in operation and compensate for wear and misalignment.

In some versions, the ring has an original thickness, the ring deforms under load causing the expanded grid structure and recesses in the low friction layer to deform, and the ring self-adjusts to elastically compensate for the deformation and return the ring to the original thickness. In other versions, the ring has an original thickness, the ring wears under load and sliding speed between the housing and pin to reduce a thickness of the low friction layer, and the expanded grid structure self-adjusts to elastically compensate for the wear to return the ring to the original thickness.

The embodiments disclosed herein have numerous advantages over conventional solutions. These bearings and tolerance rings are maintenance-free and have tolerance compensation properties against misalignment. They are also self-adjusting in the event of wear during operation and application. The bearing material also springs back to its original dimensions because of its tolerance compensating properties. These embodiments also compensate for tolerances due to temperature differences, and provide bushings for shafts and components with wider tolerances, which reduce the cost of manufacturing.

The encapsulated grid structure or stretched metal sheet uses the spring behavior of grid design and material to compensate for tolerances or, in general, radial or axial distances in tolerance ring and bearing applications with fully elastic behavior that enables a self-adjusting function. The assembly is well suited for use as a tolerance ring with sliding properties, or as a sliding bearing with elastic tolerance/distance compensating functions in radial and/or axial directions. The design is self-adjusting when the bearing wears out.

In addition, the invention compensates for the disadvantages of conventional bearing or tolerance ring properties. For bearings, the invention compensates for tolerances originating from production of the bearing, housing and shaft, thickness variations originating from temperature differences in the application, and wear or deformation by dynamic effects such as changing loads in an application.

For tolerance rings, the invention increases useful life by providing better sliding properties with compounds that generate lower friction values between the shaft and tolerance ring, lower movement forces because of lower friction, and a higher number of life cycles because of lower wear between the tolerance ring, shaft and housing. Other advantages include elastic compensation of distances in bearing and tolerance ring applications since the bearing acts like a spring, and the tolerance ring acts like a bearing.

This written description uses examples to disclose the embodiments, including the best mode, and also to enable those of ordinary skill in the art to make and use the embodiments. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Note that not all of the activities described above in the general description or the examples are required, that a portion of a specific activity may not be required, and that one or more further activities may be performed in addition to those described. The order in which activities are listed are not necessarily the order in which they are performed.

In the foregoing specification, the concepts have been described with reference to specific embodiments. However, one of ordinary skill in the art appreciates that various modifications and changes can be made without departing from the scope of the embodiments as set forth in the claims below. Accordingly, the specification and figures are to be regarded in an illustrative rather than a restrictive sense, and all such modifications are intended to be included within the scope of the embodiments.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

Also, the use of "a" or "an" are employed to describe elements and components described herein. This is done merely for convenience and to give a general sense of scope. This description should be read to include one or at least one and the singular also includes the plural unless it is obvious that it is meant otherwise.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

After reading the specification, skilled artisans will appreciate that certain features are, for clarity, described herein in the context of separate embodiments, may also be provided in combination in a single embodiment. Conversely, various features that are, for brevity, described in the context of a single embodiment, may also be provided separately or in any subcombination. Further, references to values stated in ranges include each and every value within that range.

What is claimed is:

1. A system for elastically compensating for wear and misalignment, comprising:
    a housing having a bore;
    a pin located in and coaxial with the bore of the housing;
    a ring located between the housing and the pin in the bore of the housing, the ring comprising:
        a backing layer;
        an expanded grid structure having a plurality of openings, formed from at least one of a stretched metal, expanded metal, metal alloy, plastic material and woven or nonwoven mesh, and the expanded grid structure having a wave-like configuration with strands protruding as bulges out of a plane thereof to form a pattern of waves and bow springs to provide elastic deformation under load;
        a layer laminated into the openings of the expanded grid structure; and
        at least one layer of adhesive for bonding the backing layer, expanded grid structure and layer together to provide elastic deformation of the ring between the housing and pin, wherein the ring comprises one of a bushing, a bearing and a tolerance ring, and the at least one layer of adhesive comprises a pair of layers of melt adhesive that penetrate through the expanded grid structure and immerse sides of the expanded grid structure to both the backing layer and the layer.

2. A system according to claim 1, wherein the backing layer comprises one of steel, stainless steel and a plain steel alloy, and has a thickness in a range of 0.01 mm to 5 mm, the expanded grid structure comprises one of stainless steel, spring steel, aluminum, bronze, thermoplastic and ceramic material.

3. A system according to claim 1, wherein the expanded grid structure comprises a cut raw material sheet having rows that are deformed where the strands that are twisted and form the bulges in every row, and the bulges protrude out of the plane defined by the expanded grid structure.

4. A system according to claim 1, wherein the ring has a 10 mm diameter, the layer compensates for 5 to 20 μm of elastic deformation, overall the ring compensates for 0.1 to 0.2 mm of elastic deformation, and the ring provides sliding properties and tolerance compensation for production tolerances, clearance tolerances, torque tolerances, material differences, temperature expansion and contraction, load variation, dynamic behavior, and wear between components.

5. A system according to claim 1, wherein the ring provides at least one of radial and axial elastic deformation and, when a force is applied to the pin, the expanded grid structure compresses in some areas and expands in other areas to compensate for wear and misalignment around a complete circumference of the ring.

6. A system according to claim 1, wherein the expanded grid structure is partially embedded into the layer and portions of the expanded grid structure protrude from the layer and contact the pin.

7. A system according to claim 1, wherein a geometry of the expanded grid structure is selected and patterned by dimensions of the openings with long way of the diamond (LWD), short way of the diamond (SWD), thickness, horizontal and vertical in-plane distance between adjacent openings, mesh openings, knot width and strand width versus LWD/SWD, and selection of a direction in which the expanded grid structure is laminated and deployed.

8. A system according to claim 7, wherein the ring is made stiffer by reducing a relation of transverse mesh opening to LWD, longitudinal mesh opening to SWD, increasing a strand thickness or knot width, flattening the expanded grid structure, increasing a thickness of a raw material sheet, and increasing a hardness or tensile strength of the expanded grid structure.

9. A system according to claim 1, wherein the expanded grid structure comprises a plurality of concave features that are compressible under load.

10. A system according to claim 1, wherein the layer has an undulated surface with recesses that align with concave elements of the expanded grid structure, the recesses face away from or toward the backing layer, and both the expanded grid structure and the recesses are compressible under load to provide elastic behavior in operation and compensate for wear and misalignment.

11. A system according to claim 1, wherein the ring has an original thickness, the ring deforms under load causing the expanded grid structure and recesses in the layer to deform, and the ring self-adjusts to elastically compensate for the deformation and return the ring to the original thickness.

12. A system according to claim 11, wherein the ring wears under load and sliding speed between the housing and pin to reduce a thickness of the layer, and the expanded grid structure self-adjusts to elastically compensate for the wear.

13. A system according to claim 1, wherein the layer comprises a plastic compound with organic, inorganic, metallic or plastic fillers, and has a thickness in a range of 0.01 mm to 1 mm.

14. A system according to claim 1, wherein the layer comprises a polymer comprising polyketone, polyaramid, a thermoplastic polyimide, a polyetherimide, a polyphenylene sulfide, a polyethersulfone, a polysulfone, a polyphenylene sulfone, a polyamideimide, polyethylene, a fluoropolymer, a polyamide, a polybenzimidazole, or any combination thereof.

15. A system according to claim 1, wherein the layer comprises a thermoplastic material comprising a polyketone, a polyaramid, a polyimide, a polyetherimide, a polyamideimide, a polyphenylene sulfide, a polyphenylene sulfone, a fluoropolymer, a polybenzimidazole, or a combination thereof.

16. A system according to claim 1, wherein the layer comprises a fluoropolymer comprising fluorinated ethylene propylene (FEP), polytetrafluoroethylene (PTFE), polyvinylidene fluoride (PVDF), perfluoroalkoxy (PFA), a terpolymer of tetrafluoroethylene, hexafluoropropylene, and vinylidene fluoride (THV), polychlorotrifluoroethylene (PCTFE), ethylene tetrafluoroethylene copolymer (ETFE), ethylene chlorotrifluoroethylene copolymer (ECTFE), or any combination thereof.

17. A system according to claim 1, wherein the layer comprises a polyketone, comprising polyether ether ketone (PEEK), polyether ketone, polyether ketone ketone, polyether ketone ether ketone, or a combination thereof.

18. A system according to claim 1, wherein the layer comprises a lubricant comprising oil, grease, or solid lubricants such as molybdenum disulfide, tungsten disulfide, graphite, graphene, expanded graphite, boron nitride, talc, calcium fluoride, cerium fluoride, or any combination thereof.

19. A system according to claim 1, wherein the layer comprises a ceramic or mineral comprising alumina, silica, titanium dioxide, calcium fluoride, boron nitride, mica, Wollastonite, silicon carbide, silicon nitride, zirconia, carbon black, pigments, or any combination thereof.

\* \* \* \* \*